US011233706B2

(12) United States Patent
King et al.

(10) Patent No.: US 11,233,706 B2
(45) Date of Patent: Jan. 25, 2022

(54) SYSTEM FOR MULTICHANNEL AGGREGATION OF ELECTRONIC DATA VIA A CENTRALIZED INTEGRATION HUB (71) Applicant: BANK OF AMERICA CORPORATION, Charlotte, NC (US)

(72) Inventors: Christopher Nicholas King, Charlotte, NC (US); Poppy Marie Kimball, Redwood City, CA (US); Christopher Thomas Kopechessi, Inglewood, CA (US); Rebecca Lynn Pietro, Fort Mill, SC (US); Todd E. Ratts, Littleton, CO (US); Robert Marshall Voyles, III, Tustin, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/866,895

(22) Filed: May 5, 2020

(65) Prior Publication Data
US 2020/0358664 A1 Nov. 12, 2020

Related U.S. Application Data (60) Provisional application No. 62/843,672, filed on May 6, 2019.

(51) Int. Cl.
| | | |
|---|---|---|
| *H04L 12/24* | (2006.01) |
| *G06N 20/00* | (2019.01) |
| *G06F 3/0482* | (2013.01) |
| *H04L 29/08* | (2006.01) |
| *H04L 29/06* | (2006.01) |

(52) U.S. Cl.
CPC ............ *H04L 41/22* (2013.01); *G06F 3/0482* (2013.01); *G06N 20/00* (2019.01); *H04L 67/32* (2013.01); *H04L 63/08* (2013.01)

(58) Field of Classification Search
CPC ......... H04L 41/22; H04L 67/32; H04L 63/08; H04L 67/36; H04L 67/2857; H04L 69/14; H04L 67/26; H04L 41/0806; G06N 20/00; G06F 3/0482; Y02D 30/50
See application file for complete search history.

(56) References Cited

U.S. PATENT DOCUMENTS

| | | |
|---|---|---|
| 7,313,575 B2 | 12/2007 | Carr et al. |
| 7,774,363 B2 | 8/2010 | Lim |
| 8,170,984 B2 | 5/2012 | Bakalash et al. |
| 8,438,223 B2 | 5/2013 | Polis et al. |
| 8,468,244 B2 | 6/2013 | Redlich et al. |
| 8,799,209 B2 | 8/2014 | Bakalash et al. |

(Continued)

OTHER PUBLICATIONS

Camilo Thorne, "Chatbots fortroubleshooting: A survey", May 4, 2017, Wiley, pp. 1, 4, 5 and 7 (Year: 2017).*

*Primary Examiner* — Soe Hlaing
(74) *Attorney, Agent, or Firm* — Moore & Van Allen PLLC; Seongun M. Hong (57) ABSTRACT A system provides multichannel aggregation of electronic data via a centralized integration hub. In particular, the system may aggregate data associated with a user and provide various processes and/or functions via an integration hub that is accessible by the user via a user device. In this way, the system may allow the client to efficiently navigate the various features offered by the entity for account optimization purposes.

18 Claims, 2 Drawing Sheets

(56) References Cited

U.S. PATENT DOCUMENTS

| | | | |
|---|---|---|---|
| 9,094,470 | B2 | 7/2015 | Peterson et al. |
| 9,135,093 | B2 | 9/2015 | Boller et al. |
| 9,420,050 | B1 | 8/2016 | Sakata et al. |
| 9,497,136 | B1 | 11/2016 | Ramarao et al. |
| 9,854,577 | B2 | 12/2017 | Stanwood et al. |
| 10,061,371 | B2 | 8/2018 | Geffin et al. |
| 10,142,353 | B2 | 11/2018 | Yadav et al. |
| 10,311,015 | B2 | 6/2019 | Nixon et al. |
| 10,528,554 | B2 | 1/2020 | Bagehorn et al. |
| 2008/0250323 | A1* | 10/2008 | Huff .................. G06F 9/453 715/733 |
| 2010/0229112 | A1* | 9/2010 | Ergan ............... G06F 11/0748 715/764 |
| 2015/0161190 | A1* | 6/2015 | Ariel .................. G06F 16/285 707/609 |
| 2015/0195688 | A1 | 7/2015 | Lieberman |
| 2015/0207724 | A1 | 7/2015 | Choudhury et al. |
| 2015/0347542 | A1 | 12/2015 | Sullivan et al. |
| 2016/0285999 | A1 | 9/2016 | Koonce et al. |
| 2017/0085678 | A1* | 3/2017 | Babu .................. H04L 67/306 |
| 2018/0041390 | A1 | 2/2018 | Saavedra |
| 2020/0065121 | A1* | 2/2020 | Hart .................. G06F 9/4451 |
| 2020/0159551 | A1* | 5/2020 | Booth .................. G06F 9/453 |

\* cited by examiner

┌─────────────────────────────────────────────────────────┐
│ RECEIVE, FROM A USER DEVICE, A REQUEST TO ACCESS THE    │
│              CENTRALIZED INTEGRATION HUB                │
│                          201                            │
└─────────────────────────────────────────────────────────┘
                             │
                             ▼
┌─────────────────────────────────────────────────────────┐
│ DISPLAY TO THE USER, VIA A GRAPHICAL INTERFACE OF THE   │
│ CENTRALIZED INTEGRATION HUB, AN AGGREGATED SET OF DATA  │
│                 ASSOCIATED WITH THE USER                │
│                          202                            │
└─────────────────────────────────────────────────────────┘
                             │
                             ▼
┌─────────────────────────────────────────────────────────┐
│ RECEIVE A SELECTION OF A PROCESS ASSOCIATED WITH AN     │
│                    ACCOUNT OF THE USER                  │
│                          203                            │
└─────────────────────────────────────────────────────────┘
                             │
                             ▼
┌─────────────────────────────────────────────────────────┐
│  AUTOMATICALLY EXECUTE THE PROCESS VIA THE CENTRALIZED  │
│                     INTEGRATION HUB                     │
│                          204                            │
└─────────────────────────────────────────────────────────┘
```

FIG. 2

SYSTEM FOR MULTICHANNEL AGGREGATION OF ELECTRONIC DATA VIA A CENTRALIZED INTEGRATION HUB

PRIORITY CLAIM

This application claims priority to U.S. Provisional Application Ser. No. 62/843,672, entitled "SYSTEM FOR MULTICHANNEL AGGREGATION OF ELECTRONIC DATA VIA A CENTRALIZED INTEGRATION HUB", filed May 6, 2019, which is incorporated herein by reference in its entirety.

FIELD OF THE INVENTION

The present disclosure embraces a system for multichannel aggregation of electronic data via a centralized integration hub.

BACKGROUND

There is a need for an efficient way to aggregate electronic data sourced through multiple channels.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for multichannel aggregation of electronic data via a centralized integration hub. In particular, the system may aggregate data associated with a user and provide various processes and/or functions via an integration hub that is accessible by the user via a user device.

Accordingly, embodiments of the present disclosure provide a system for multichannel aggregation of electronic data via a centralized integration hub. The system may comprise a memory device with computer-readable program code stored thereon; a communication device; and a processing device operatively coupled to the memory device and the communication device. The processing device may configured to execute the computer-readable program code to establish a first communication channel with a user device associated with a user; receive, from the user device, a request to access the centralized integration hub; display to the user, via a graphical interface of the centralized integration hub, an aggregated set of data associated with the user; receive a selection of a process associated with an account of the user; and automatically execute the process via the centralized integration hub.

In some embodiments, the aggregated set of data comprises a list of one or more functions in use by the user and a list of one or more functions not in use by the user.

In some embodiments, the computer-readable program code further causes the processing device to detect an interaction with the user across a second communication channel; and based on the interaction with the user across the second communication channel, transmit a notification to the first communication channel, the notification comprising the one or more functions not in use by the user.

In some embodiments, the computer-readable program code further causes the processing device to generate a prioritization of functions using a machine learning algorithm.

In some embodiments, the computer-readable program code further causes the processing device to determine, based on detecting a pattern of the user, that the user is experiencing an issue with a function; and automatically push a notification to the user regarding the issue, wherein the notification comprises a solution to the issue.

In some embodiments, the solution to the issue is presented to the user in natural language by an artificial intelligence agent.

Embodiments of the present disclosure also provide a computer program product for multichannel aggregation of electronic data via a centralized integration hub. The computer program product may comprise at least one non-transitory computer readable medium having computer-readable program code portions embodied therein, the computer-readable program code portions comprising executable portions for establishing a first communication channel with a user device associated with a user; receiving, from the user device, a request to access the centralized integration hub; displaying to the user, via a graphical interface of the centralized integration hub, an aggregated set of data associated with the user; receiving a selection of a process associated with an account of the user; and automatically executing the process via the centralized integration hub.

In some embodiments, the aggregated set of data comprises a list of one or more functions in use by the user and a list of one or more functions not in use by the user.

In some embodiments, the computer-readable program code portions further comprise executable portions for detecting an interaction with the user across a second communication channel; and based on the interaction with the user across the second communication channel, transmitting a notification to the first communication channel, the notification comprising the one or more functions not in use by the user.

In some embodiments, the computer-readable program code portions further comprise executable portions for generating a prioritization of functions using a machine learning algorithm.

In some embodiments, the computer-readable program code portions further comprise executable portions for determining, based on detecting a pattern of the user, that the user is experiencing an issue with a function; and automatically pushing a notification to the user regarding the issue, wherein the notification comprises a solution to the issue.

In some embodiments, the solution to the issue is presented to the user in natural language by an artificial intelligence agent.

Embodiments of the present disclosure also provide a computer-implemented method for multichannel aggregation of electronic data via a centralized integration hub, wherein the computer-implemented method comprises establishing a first communication channel with a user device associated with a user; receiving, from the user device, a request to access the centralized integration hub; displaying to the user, via a graphical interface of the centralized integration hub, an aggregated set of data associated with the user; receiving a selection of a process associated with an account of the user; and automatically executing the process via the centralized integration hub.

In some embodiments, the aggregated set of data comprises a list of one or more functions in use by the user and a list of one or more functions not in use by the user.

In some embodiments, the computer-implemented method further comprises detecting an interaction with the user across a second communication channel; based on the interaction with the user across the second communication channel, transmitting a notification to the first communication channel, the notification comprising the one or more functions not in use by the user.

In some embodiments, the computer-implemented method further comprises generating a prioritization of functions using a machine learning algorithm.

In some embodiments, the computer-implemented method further comprises determining, based on detecting a pattern of the user, that the user is experiencing an issue with a function; and automatically pushing a notification to the user regarding the issue, wherein the notification comprises a solution to the issue.

In some embodiments, the solution to the issue is presented to the user in natural language by an artificial intelligence agent.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

Embodiments of the present disclosure provide a system for multichannel aggregation of electronic data via a centralized integration hub. The system may aggregate various types of data associated with an authenticated user. Upon aggregating the data, the system may present the aggregated data to the authenticated user via a centralized integration hub to allow the user to efficiently manage the aggregated data and perform functions to accomplish the user's objectives. The system may further provide for automated execution of certain processes based on the aggregated data.

An exemplary use case of the system described herein follows. The system may be owned and/or operated by an entity such as a financial institution, where the centralized hub aggregates data regarding an account of a user (e.g., a client of the financial institution). For example, the aggregated data may include account settings, user preferences, account resources (e.g., an account balance), history of interactions between the user and entity (e.g., account logins, software installed, locations of the entity visited by the user, or the like), products or services currently in use and/or offered by the entity, or the like. In such an embodiment, the system may comprise an account optimization tool, where the account optimization tool provides, via a graphical interface, one or more indicators (e.g., status meter, gauge, chart, graph, or the like) of how effectively the client is using the features offered by their account with the entity. For instance, the account optimization tool may notify the user about which features are being used or not being used (e.g., direct deposit setup to waive recurring deductions, paperless billing, savings transfers, or the like). If the system detects that a particular feature is not being used, the graphical interface may further provide an interactive link (e.g., clickable button, hyperlink, or the like) which may direct the client to a set-up page for the non-activated feature (e.g., paperless billing). In this way, the system may allow the client to efficiently navigate the various features offered by the entity for account optimization purposes.

In some embodiments, the graphical interface may be configured to present to the user a guided setup page (e.g., a landing zone) which may present to the user a process flow for optimizing the user's account. For instance, the graphical interface may display various items to the user, such as an itemized list of steps that the user may take to enroll in the products and/or services offered in the entity, new products or features, or the like. In some embodiments, the graphical interface may further display legacy products or services provided by the entity which may still be in use by the client. The system may further display a comparison of the benefits and/or features of legacy products in comparison with newer products such that the client may at a glance determine which product is optimal.

In some embodiments, the system may be configured to integrate features and/or functions across multiple communication channels. In this regard, the system may automatically push information about certain features and/or the signup of said features or functions to the user device (e.g., a first communication channel) based on an interaction with the user across a second communication channel. In an exemplary embodiment, the entity may have had a telephone conversation with a client about the paperless billing feature of the entity. Based on the telephone conversation, the system may automatically push a signup page or process of paperless billing to the client via a user device (e.g., mobile phone). In other embodiments, a decision engine and/or artificial intelligence ("AI") system may automatically prioritize which features to highlight to the user. In certain embodiments, the decisioning of the AI system may be overridden via an associate interaction. For instance, if the AI system has decided to prioritize informing the user about mobile deposit features, but an agent (e.g., an employee of the entity) has determined that the client is not interested in mobile deposits (e.g., via a phone conversation with the client), the agent may override the notification regarding mobile deposit features with respect to said client. The system may further use machine learning to determine prioritizations on a per-user basis. For instance, the system may determine, via machine learning, that a particular user responds well to a particular prioritization, where a second user may respond well to a second prioritization.

The system may further be configured to recognize behaviors or patterns of the user (e.g., via machine learning). For instance, the system may detect that the user is having issues with a credit card (e.g., the user is repeatedly attempting to insert the card into a payment terminal. Based on detecting the user behavior and/or the underlying issue, the system may automatically push a notification to the user regarding the underlying issue (e.g., the security chip on the credit card has failed). In such an embodiment, the notification may recommend a solution to the underlying issue (e.g., recommend that the user replace the credit card). In other embodiments, the system may further track user's purchasing and/or payment behaviors. Based on the user's behaviors, the system may notify the user of certain products or services offered by the entity which may benefit the user. In some embodiments, the system may further learn the timing of behaviors of the user. For instance, if the system detects that the user typically accesses the entity system in the evening, the system may time pushing certain notifications to the user to coincide with the times in which the user is generally active in the entity system.

In some embodiments, the system may provide recommendations for the user based on a history of the user's interactions with the entity system. For instance, the user may have incurred a deduction (e.g., a monthly recurring deduction from the user's account) due to lack of resources in the user account. Based on this historical information, the system may notify the user with a recommended solution (e.g., enroll in direct deposit to avoid the monthly deduction). In some embodiments, the system may further use an AI agent to present, in natural language, the recommendation as well as steps that the user may take to resolve the issue. In some embodiments, the notification to the user may be sent via a mobile app (e.g., via a mobile device associated with the user). Additionally or alternatively, the notification may be sent to the user via other channels (e.g., a desktop computer, other AI-based agents, or the like).

The system may also support user authentication via alternative credentials. For instance, rather than authenticating a user via a username and password (e.g., as used in online transactions), the system may support authentication of a user via a card associated with the user (e.g., a debit card of the user). In some embodiments, the system may further integrate various features, products, and/or services of partnered entities and/or affiliate entities.

Figure 1:
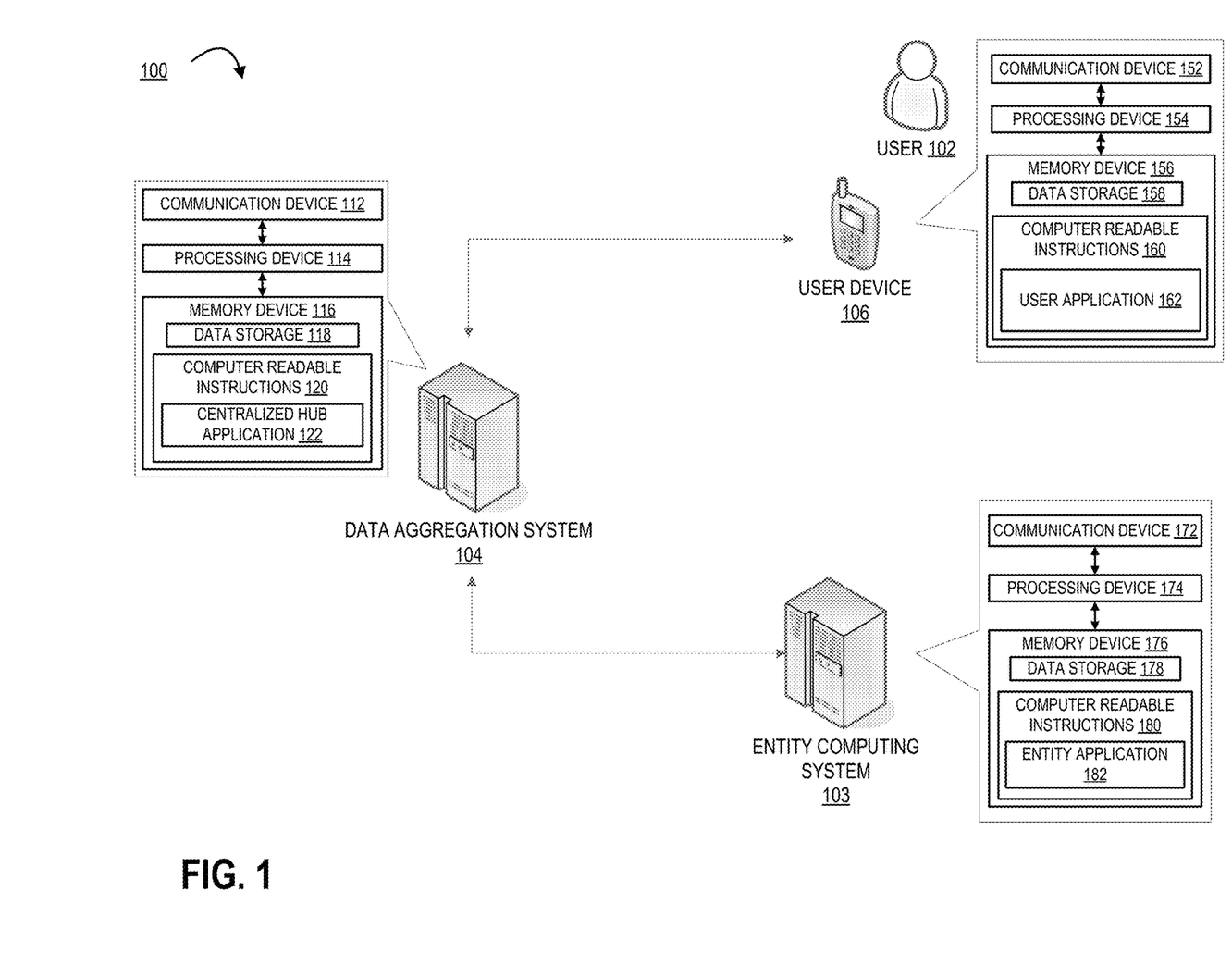
FIG. 1 illustrates an operating environment for the data aggregation system, in accordance with one embodiment of the present disclosure.

Turning now to the figures, FIG. 1 illustrates an operating environment 100 for the data aggregation system, in accordance with one embodiment of the present disclosure. In particular, FIG. 1 illustrates a data aggregation system 104 that is operatively coupled, via a network, to a user device 106 and/or an entity computing system 103. In such a configuration, the data aggregation system 104 may transmit information to and receive information from the user device 106 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the data aggregation system 104 and the entity computing system 103 may be executed on a single computing system. Furthermore, a single system, device, or server as depicted in FIG. 1 may represent multiple systems, devices, or servers.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The user device 106 as depicted in FIG. 1 may be a device which is owned and/or operated by a user 102. The user 102 may use the user device 106 to log onto the data aggregation system 104 and/or the entity computing system 103 to access the data aggregation functions as described herein. In this regard, the user device 106 may be a mobile device such as a smartphone, wearable smart device, tablet, laptop computer, or the like. In other embodiments, the user device 106 may be a stationary device such as a desktop computer, IoT device, networked terminal, or the like.

The user device 106 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a user application 162. The user application 162 may comprise computer-executable program code which may instruct the processing device 154 to perform certain logic, data processing, and data storing functions of the application to accomplish the entity's and/or the user's objectives. For instance, the user application 162 may allow the user 102 to log onto the data aggregation system 104 to access the functions of the centralized hub. In this regard, the user application 162 may be an entity-provided application such as a mobile app or software suite, or the user application 162 may be a third party application such as a web browser. In some embodiments, the memory device 156 includes data storage 158 for storing data related to the system environment, but not limited to data created and/or used by the user application 162.

As further illustrated in FIG. 1, the data aggregation system 104 may be a computing system within the entity system which provides data aggregation and integration functions across multiple channels. Accordingly, the data aggregation system 104 may comprise a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the user device 106 and/or the entity computing system 103. As such, the communication device 112 generally comprises a modem, antennae, WiFi or Ethernet adapter, radio transceiver, or other device for communicating with other devices on the network.

The memory device 116 comprises computer-readable instructions 120 and data storage 118, which in one embodiment includes the computer-readable instructions 120 of a centralized hub application 122. The centralized hub application 122 may comprise executable code for causing the processing device 114 to perform various data aggregation and integration functions with respect to data associated with the user 102. In this regard, the data aggregation system 104 may receive authentication credentials from the user 102, the user device 106, and/or the entity computing system 103 and authenticate/authorize users and applications based on the authentication credentials. Examples of said authentication credentials may include a username and password combination, PIN, secure token, cryptographic key, biometric data, or the like.

The operating environment 100 may further comprise an entity computing system 103. The entity computing system 103 may refer to a computing system which may be operated by a user such as an administrator or employee of the entity. The entity computing system 103 may comprise a processing device 174 operatively coupled to the communication device 172 and a memory device 176 comprising data storage 178 and computer readable instructions 180. The computer readable instructions 180 may comprise an entity application 182 which may be configured to instruct the processing device 174 to execute certain functions over the network, such as interacting with the user device 106 and/or the data aggregation system 104.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
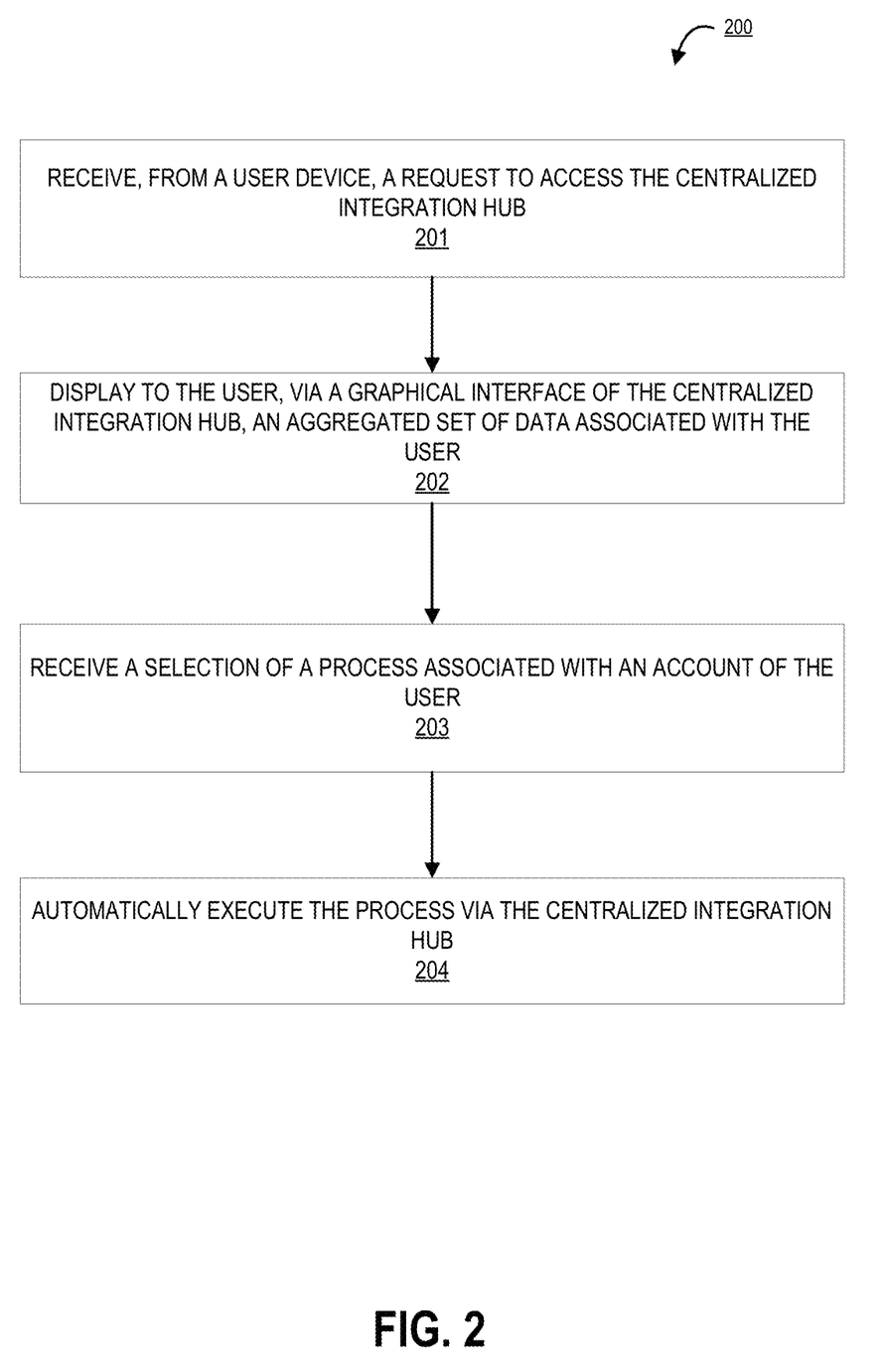
FIG. 2 illustrates a process flow for the data aggregation system, in accordance with one embodiment of the present disclosure.

FIG. 2 illustrates a process flow 200 for the data aggregation system, in accordance with one embodiment of the present disclosure. The process begins at block 201, where the system receives, from a user device, a request to access the centralized integration hub. The user may access the centralized hub via an application provided by the entity, such as a mobile application. The system may require the user submit one or more authenticated credentials in order to be authorized to access the centralized hub. The user may request to access the centralized hub, for instance, to manage an account maintained by the entity for the user.

The process continues to block 202, where the system displays to the user, via a graphical interface of the centralized integration hub, an aggregated set of data associated with the user. The graphical interface may be presented to the user via a display of the user device (e.g., a monitor, touchscreen, or the like). The graphical interface may present one or more sets of aggregated data with respect to the account of the user. For instance, the aggregated data may indicate which, if any, products or services related to the account are currently in use by the user. In an exemplary embodiment in which the entity is a financial institution, the aggregated data may indicate whether the user has enrolled in such features as paperless billing, direct deposits, or the like. If the user is currently not enrolled in one or more features, the graphical interface may notify the user that the user is not enrolled in said features. The graphical interface may further comprise interactive links (e.g., hyperlinks, clickable buttons, or the like) which allow the user to select one or more processes to enable features currently not in use by the user.

The process continues to block 203, where the system receives a selection of a process associated with an account of the user. Via the centralized hub, the user may perform various account management functions to optimize the account. For instance, the user may select an option to enroll in paperless billing, set up recurring transfers, set up direct deposit, or the like. In some embodiments, the system may use machine learning to adaptively identify certain products and/or communication channels to suit the user's preferences. Once such products and/or channels have been identified, the system may push a notification to the user through the user-preferred channels, where the notification contains an interactive link to begin the sign-up process for the identified products.

The process concludes at block 204, where the system automatically executes the process via the centralized integration hub. The system may use historical data and/or account information of the user to prefill the information needed to enable the selected features. For instance, the system may access the user's account information to automatically generate certain documents (e.g., consent forms) to enroll in a service offered by the entity.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multichannel aggregation of electronic data via a centralized integration hub, the system comprising:
    a memory device with computer-readable program code stored thereon;
    a communication device; and
    a processing device operatively coupled to the memory device and the communication device, wherein the processing device is configured to execute the computer-readable program code to:
        establish a first communication channel with a user device associated with a user;
        receive, from the user device, a request to access the centralized integration hub;
        display to the user, via a graphical interface of the centralized integration hub, an aggregated set of data associated with the user, wherein the graphical interface comprises an account optimization tool that indicates one or more features of the centralized integration hub that are in use by the user, wherein the account optimization tool is configured to:
            display one or more indicators of how effectively the user is using the one or more features of the centralized integration hub, wherein the one or more indicators comprises at least one of a status meter or gauge;
            detect that first feature of the centralized integration hub is not in use by the user; and
            provide, to the user, an interactive link to activate the first feature of the centralized integration hub;
        present a guided setup page to the user, wherein the guided setup page presents to the user a process flow for optimizing an account of the user;
        receive a selection of a process within the process flow; and
        automatically execute the process via the centralized integration hub.

2. The system according to claim 1, wherein the aggregated set of data comprises a list of one or more functions in use by the user and a list of one or more functions not in use by the user.

3. The system according to claim 2, wherein the computer-readable program code further causes the processing device to:
    detect an interaction with the user across a second communication channel; and
    based on the interaction with the user across the second communication channel, transmit a notification to the first communication channel, the notification comprising the one or more functions not in use by the user.

4. The system according to claim 2, wherein the computer-readable program code further causes the processing device to generate a prioritization of functions using a machine learning algorithm.

5. The system according to claim 1, wherein the computer-readable program code further causes the processing device to:
    determine, based on detecting a pattern of the user, that the user is experiencing an issue with a function; and
    automatically push a notification to the user regarding the issue, wherein the notification comprises a solution to the issue.

6. The system according to claim 5, wherein the solution to the issue is presented to the user in natural language by an artificial intelligence agent.

7. A computer program product for multichannel aggregation of electronic data via a centralized integration hub, the computer program product comprising at least one non-transitory computer readable medium having computer-readable program code portions embodied therein, the computer-readable program code portions comprising executable portions for:
    establishing a first communication channel with a user device associated with a user;
    receiving, from the user device, a request to access the centralized integration hub;
    displaying to the user, via a graphical interface of the centralized integration hub, an aggregated set of data associated with the user, wherein the graphical interface comprises an account optimization tool that indicates one or more features of the centralized integration hub that are in use by the user, wherein the account optimization tool is configured to:
        display one or more indicators of how effectively the user is using the one or more features of the centralized integration hub, wherein the one or more indicators comprises at least one of a status meter or gauge;
        detect that first feature of the centralized integration hub is not in use by the user; and
        provide, to the user, an interactive link to activate the first feature of the centralized integration hub;

present a guided setup page to the user, wherein the guided setup page presents to the user a process flow for optimizing an account of the user;

receive a selection of a process within the process flow; and automatically execute the process via the centralized integration hub.

8. The computer program product according to claim 7, wherein the aggregated set of data comprises a list of one or more functions in use by the user and a list of one or more functions not in use by the user.

9. The computer program product according to claim 8, wherein the computer-readable program code portions further comprise executable portions for:

detecting an interaction with the user across a second communication channel; and based on the interaction with the user across the second communication channel, transmitting a notification to the first communication channel, the notification comprising the one or more functions not in use by the user.

10. The computer program product according to claim 8, wherein the computer-readable program code portions further comprise executable portions for generating a prioritization of functions using a machine learning algorithm.

11. The computer program product according to claim 7, wherein the computer-readable program code portions further comprise executable portions for:

determining, based on detecting a pattern of the user, that the user is experiencing an issue with a function; and automatically pushing a notification to the user regarding the issue, wherein the notification comprises a solution to the issue.

12. The computer program product according to claim 11, wherein the solution to the issue is presented to the user in natural language by an artificial intelligence agent.

13. A computer-implemented method for multichannel aggregation of electronic data via a centralized integration hub, wherein the computer-implemented method comprises:

establishing a first communication channel with a user device associated with a user;

receiving, from the user device, a request to access the centralized integration hub;

displaying to the user, via a graphical interface of the centralized integration hub, an aggregated set of data associated with the user, wherein the graphical interface comprises an account optimization tool that indicates one or more features of the centralized integration hub that are in use by the user, wherein the account optimization tool is configured to:

display one or more indicators of how effectively the user is using the one or more features of the centralized integration hub, wherein the one or more indicators comprises at least one of a status meter or gauge;

detect that first feature of the centralized integration hub is not in use by the user; and provide, to the user, an interactive link to activate the first feature of the centralized integration hub;

present a guided setup page to the user, wherein the guided setup page presents to the user a process flow for optimizing an account of the user;

receive a selection of a process within the process flow; and automatically execute the process via the centralized integration hub.

14. The computer-implemented method according to claim 13, wherein the aggregated set of data comprises a list of one or more functions in use by the user and a list of one or more functions not in use by the user.

15. The computer-implemented method according to claim 14, wherein the computer-implemented method further comprises:

detecting an interaction with the user across a second communication channel; and based on the interaction with the user across the second communication channel, transmitting a notification to the first communication channel, the notification comprising the one or more functions not in use by the user.

16. The computer-implemented method according to claim 14, wherein the computer-implemented method further comprises generating a prioritization of functions using a machine learning algorithm.

17. The computer-implemented method according to claim 13, wherein the computer-implemented method further comprises:

determining, based on detecting a pattern of the user, that the user is experiencing an issue with a function; and automatically pushing a notification to the user regarding the issue, wherein the notification comprises a solution to the issue.

18. The computer-implemented method according to claim 17, wherein the solution to the issue is presented to the user in natural language by an artificial intelligence agent.

* * * * *